(12) United States Patent
Hermans et al.

(10) Patent No.: US 6,280,624 B1
(45) Date of Patent: Aug. 28, 2001

(54) BIOLOGICAL WASTE WATER PURIFICATION PROCESS AND DEVICE

(75) Inventors: Monica Hermans, Neuss; Ulrich Hermanns, Essen; Sigurd Schlegel, Moers; Andreas Stein, Duelmen, all of (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/297,282

(22) PCT Filed: Oct. 23, 1997

(86) PCT No.: PCT/EP97/05847

§ 371 Date: Jun. 21, 1999

§ 102(e) Date: Jun. 21, 1999

(87) PCT Pub. No.: WO98/18727

PCT Pub. Date: May 7, 1998

(30) Foreign Application Priority Data

Oct. 31, 1996 (DE) .............................................. 196 44 080

(51) Int. Cl.[7] ........................................................ C02F 3/02
(52) U.S. Cl. ............................................ 210/614; 210/620
(58) Field of Search ...................... 210/620, 627, 210/150, 151, 220, 221.1, 614; 261/DIG. 70–71

(56) References Cited

U.S. PATENT DOCUMENTS 3,547,812 * 12/1970 McWhirter .
3,574,331 * 4/1971 Kamakura et al. .
3,772,187 * 11/1973 Othmer .
3,954,606 * 5/1976 Block et al. .
3,968,035 * 7/1976 Howe .
3,994,802 * 11/1976 Casey et al. .
4,104,167 * 8/1978 Besik .
4,163,712 * 8/1979 Smith .
4,166,790 * 9/1979 Zlokarnik et al. .
4,202,763 * 5/1980 Shimizu et al. .
4,206,047 * 6/1980 Mandt .
4,374,027 * 2/1983 Severeid et al. .

FOREIGN PATENT DOCUMENTS

3028336 * 2/1982 (DE) .
3403298 * 8/1985 (DE) .

* cited by examiner

Primary Examiner—Chester T. Barry
Assistant Examiner—Fred Prince
(74) Attorney, Agent, or Firm—Connolly Bove Lodge & Hutz, LLP

(57) ABSTRACT

Biological wastewater is purified in a sewage treatment plant having an activation tank of a depth greater than approximately 5 m per meter into which a feed of compressed air is fed. An oxygen-containing gas having an oxygen content is increased with respect to the air or pure oxygen and is fed to the mixed liquor in at least a part of the aerobic tank volume of the activation tank. The oxygen containing gas is fed until the total content of the gas in the mixed liquor based upon saturation value is below 150% before the mixed liquor is fed to a secondary clarification.

10 Claims, No Drawings

US 6,280,624 B1

BIOLOGICAL WASTE WATER PURIFICATION PROCESS AND DEVICE

BACKGROUND OF THE INVENTION

The invention relates to a process and an apparatus for biological wastewater purification.

For biological wastewater purification in sewage treatment plants, the activated sludge process is generally used. In this process, different types of constituents in water are used for respiration or are partially utilized for the synthesis of new biomass by microorganisms (bacteria) suspended in the wastewater in an activation tank in a first process stage, the so-called activation. In the course of this, nitrate is converted to molecular nitrogen (denitrification) and $CO_2$ is formed. A large part of the gases is removed by ventilation and mechanical circulation and leaves the system via the gas phase. In a second process stage, the so-called secondary clarification, the bacteria are then separated from the water in a secondary clarification tank by sedimentation and can then be transported back to the activation tank. Sewage treatment plants and processes of this type are described, for example, in "Abwassertechnik" [Wastewater engineering], Hosang and Bischof, 9th edition, Verlag B. G. Teubner, 1989.

Owing to increased stringency of legal requirements of wastewater purification and possibly owing to an increase in the pollutant loading of the wastewater, an expansion of existing sewage treatment plants is frequently necessary in order to improve their purification capacity. Generally, the tank capacities need to be increased for this. In the case of the secondary clarification tanks, the surface area generally needs to be increased, whereas in the case of the activation tanks, the capacity can also be increased by increasing the depth of the tank while maintaining a constant surface area, which decreases the space requirement and the construction costs.

However, it has been found that, in sewage treatment plants, as the depth of the activation tank increases, the problem of sludge flotation in the secondary clarification tank occurs to an increasing extent. This gives rise to relatively serious problems in operating the sewage treatment plant and relatively high expenditure is necessary to cope with sludge flotation of this type.

A constant or periodic occurrence of sludge flotation can lead to unwanted discharge of sludge from the sewage treatment plant, which can cause the permissible limit values, for example for chemical oxygen demand (COD), biochemical oxygen demand ($BOD_5$), nitrogen and suspended matter, to be exceeded. In addition, on account of the loss of activated sludge, the bacterial mass decreases, which reduces the purification capacity of the sewage treatment plant.

Since hydrostatic pressure increases with increasing depth of the activation tank, a higher proportion of gas is dissolved in the mixed liquor, which leads to sludge flotation owing to formation of gas bubbles in the activated sludge in the less deep secondary clarification tank. In addition, excessive oxygen input into the denitrification stage of the activation tank adversely affects the denitrification. As a result, uncontrolled denitrification can take place in the secondary clarification tank and cause a sludge flotation.

To solve the problem of excessive sludge flotation in sewage treatment plants, attempts were made to control the oxygen content better or to prevent the input of atmospheric oxygen for the denitrification stage of the activation tank. It has also been proposed, instead of a conventional secondary clarification, to provide a dissolved air flotation, or to use an additional degasification zone or a flat degasification tank with aeration by coarse or medium bubbles. Furthermore, the use of a weir having a special overflow edge, a weir cascade and, if appropriate, an additional submerged wall with a possibility for taking off foam have been described (Korrespondenz Abwasser, Volume 43, No. 6, June 1996, pages 1083–1086, Report of the ATV Specialist Committee 2.6: "Aerobe biologische Abwasserreinigungsverfahren" [Aerobic biological wastewater purification processes]).

However, the measures mentioned above either increase space requirements of the activation stage and are cost-intensive in construction and operation, or they only partially prevent flotation.

DE 43 29 239 A1, furthermore, has disclosed a process and an apparatus for biological wastewater purification, in which process and apparatus, with feed of air or oxygen, constituents in the water are used in respiration by the bacteria, the bacterial content in the activation tank being increased by lamellae packs arranged to slope upward, and the activated sludge being thickened and the lamellae packs being arranged at the end of the flowpath of the activation tank at a distance upstream of the outlet. This process is said to decrease markedly the capacities of the activation tanks, a width of 5 m, a length of 10 m and a depth of 4 m being mentioned as exemplary activation tank dimensions. This process and this apparatus are not concerned with deep activation tanks or problems of sludge flotation.

SUMMARY OF THE INVENTION

The object underlying the invention is to improve the process mentioned at the outset in such a manner that the sludge flotation in the secondary clarification tank is relatively reliably avoided. Furthermore, no further process stages or complex additional fittings in the clarification tank shall be necessary.

DETAILED DESCRIPTION

This object is achieved by feeding, continuously or at intervals, an oxygen-containing gas having an oxygen content increased with respect to air, or pure oxygen, to the mixed liquor in at least a part of the aerobic tank volume of the activation tank. In contrast to the processes known hitherto for preventing sludge flotation, in this case, a sludge flotation in the secondary clarification tank is relatively reliably avoided by increasing the oxygen input into the activation stage. The oxygen-containing gas having an oxygen content increased with respect to air, or pure oxygen, in this case is fed to the mixed liquor until the proportion of dissolved oxygen of the total content of dissolved gases is so high that the utilization of the oxygen present in nitrate or nitrite is prevented by the bacteria in the secondary clarification tank. Supersaturation with nitrogen can, on the one hand, be prevented if the oxygen-containing gas or pure oxygen is used in the entire aerobic part of the activation stage. If, on the other hand, oxygen-containing gas or pure oxygen is fed only in a section of the aerobic part of the activation stage, although, owing to the preceding aeration or denitrification in the anoxic part/process step, there is initially an increase in the content of dissolved gas in the mixed liquor, before exiting the activation tank, this is decreased using the oxygen-containing gas or pure oxygen. At the same time, the necessary supply of oxygen is ensured. In the simplest case, sufficient oxygen-containing gas or pure oxygen is fed to the mixed liquor so that an oxygen content of at least approximately 1 to 2 mg/l is established therein. The optimum oxygen content and the optimum amount of oxygen to be fed is dependent on the wastewater to be purified, the sewage treatment plant and its specific mode of operation and can be determined by only a few simple tests. A particular advantage of the process according to the invention is that, to carry it out, in principle no further fittings are required in the activation tank. The oxygen-containing gas or the pure oxygen can be fed via the same device which is also used to introduce the air into the mixed liquor. Thus, all conventional aeration devices of the prior art can be used, devices for pressure aeration with fine bubbles, such as candle aerators or disk aerators, being preferred. In addition, use of devices specially designed for pure oxygen is envisaged, for example a gas-dispersion hose, an ejector (pump equipped with venturi tube and mixing chamber) or oxidizer (pressure vessel through which water flows), but preferably a gas-dispersion hose. The devices mentioned above advantageously give rise to only relatively low capital expenditure and have no additional space requirement. The feed of compressed air and oxygen-containing gas or pure oxygen can be separated in space, which means that they are fed in different sections of the activation tank or in different separate tanks of the activation stage. However, the feed can also be separated in time, for example in a round relatively large activation tank of a relatively small sewage treatment plant. In particular when pure oxygen is used, the process according to the invention saves energy costs for pressure aeration, and adequate oxygen supply to the activation stage is ensured even in the event of shock loading of the sewage treatment plant.

The oxygen-containing gas used is preferably pure oxygen. The term "pure oxygen" is here taken to mean oxygen which has a minimum purity of approximately 80% by volume. For example, technical-grade oxygen, which is produced by liquefaction of air and typically complies with the purity specification "oxygen 2.0" (minimum purity 99% by volume) or "oxygen 2.5" (minimum purity 99.5% by volume), can be used. Use of such "technical purity grade" oxygen gases is possible if this still allows an economic mode of operation to be achieved.

It is envisaged according to the invention to feed the oxygen-containing gas or pure oxygen to the mixed liquor until the total content of gas in the mixed liquor, based on the saturation value, is less than 150%, preferably less than 110%, before the mixed liquor is fed to the secondary clarification. The total content of gas here is taken to mean the sum of the gas contents in % of the partial pressure of the corresponding gas in the ambient air which is present in the mixed liquor, based on atmospheric pressure and at a given temperature. The gases are predominantly nitrogen, carbon dioxide and oxygen.

According to the invention, the oxygen-containing gas or pure oxygen is fed to the activation tank in the last third of the activation tank or in the last aerobic tank of a tank cascade.

It is advantageous that the oxygen-containing gas or pure oxygen replaces the conventional aeration only at intervals, but preferably for 15 to 45 minutes per hour. Preferably, the oxygen-containing gas or pure oxygen replaces the conventional aeration at an increased hydraulic loading, which can occur, for example as the consequence of rainfall.

According to the invention it is envisaged that oxygen-containing gas or pure oxygen is fed as a function of the sludge level in the secondary clarification tank. It is likewise envisaged to control the feed of oxygen-containing gas or pure oxygen as a function of the total gas content in the mixed liquor.

According to the invention, the input of the oxygen-containing gas or pure oxygen can also be controlled according to two preset values, which are separated in time and/or space, for the oxygen content in the mixed liquor or according to one preset value for the oxygen content and one preset value for the total gas content in the mixed liquor. The control is advantageously performed so that the oxygen content in the mixed liquor at the outlet of the activation stage is not less than 1 to 2 mg/l and not greater than 10 m g/l, particularly preferably the total content of gas in the mixed liquor being at the same time less than 110%. Control according to two preset values; separated in time and/or space is particularly advantageous if the wastewaters have a relatively low acid capacity or are highly polluted. This is because in this case, the carbon dioxide must be removed to a sufficient extent that the pH does not become less than approximately 6.5. In addition, in the case of a particular composition of wastewaters, for example in the case of wastewaters having a relatively low pollutant content (COD, $BOD_5$, nitrogen and suspended matter), control of this type can be necessary if the oxygen demand is already covered before the required amount of nitrogen can be removed.

The oxygen-containing gas or pure oxygen can be delivered via all conventional supply methods, for example liquid storage tank, on-site process or a pipeline. The term "pipeline" is taken to mean here a line already existing on site of a fixed pipe grid or a pipe-line to an adjacent source of the oxygen-containing gas or pure oxygen, for example an adjacent air fractionation plant. Preference is given to supply via a pipeline, since it enables a relatively high operational reliability and great security of supply with a relatively low technical expenditure and small space requirement.

It is additionally envisaged according to the invention that the oxygen-containing gas or pure oxygen is additionally fed to the mixed liquor in the event of shock loadings of the wastewater with an increased oxygen demand or in the case of an increased energy demand of the sewage treatment plant. In such cases, the pressure aeration, for example, can be decreased or even interrupted completely and can be partly or completely replaced by feeding the oxygen-containing gas or pure oxygen.

The object of the invention is further achieved by an apparatus for biological wastewater purification having an activation tank of a depth greater than approximately 5 m, in which a device for feeding an oxygen-containing gas having an oxygen content which is increased with respect to air, or pure oxygen, into the mixed liquor is assigned to the activation tank, which device is suitable for fine-bubble pressure aeration. As devices for fine-bubble pressure aeration, disk aerators or candle aerators are preferably used and a pipe-line for supplying with an oxygen-containing gas having an oxygen content increased with respect to air, or pure oxygen, is advantageously assigned to the device. It is envisaged according to the invention to arrange devices for measuring the oxygen content in the mixed liquor in the aerobic region of the activation tan:c, and preferably to measure the oxygen content using probes. As probes for measuring oxygen concentration, membrane electrodes, so-called "Clark electrodes" can preferably be used. It is likewise possible to measure the oxygen concentration using the so-called "Züllig electrodes" or using potentiometric methods. These measuring devices are described, for example, in "Kleine Oxi-Fibel, Technologie und Methodik zur Messung des Gelöst-Sauerstoffs mit Membran Elektroden" (The little oxygen guide, technology and methodology for measuring dissolved oxygen using membrane electrodes), Chem. Ing. Horst Nösel, WTW GmbH, Weilheim.

The invention is now described in more detail with reference to an illustrative example. In the case of sewage treatment plants having activation tanks of a depth of 6 to 10 m, which have been used to purify wastewaters having a mean wastewater loading of approximately 200 to 300 mg/l of oxygen ($BOD_5$) and 50 to 100 mg/l of nitrogen content (TKN), pure oxygen was fed via gas dispersion hoses or aerators to the mixed liquor. A flow rate of pure oxygen of 0.1 to 0.8 kg of oxygen per $m^3$ of wastewater was set, so that the oxygen content was always in a range from 1 to 10 m g/l. For example, in a sewage treatment plant having an activation tank depth of 9.3 m, which purified wastewaters having a mean wastewater loading of approximately 2000 population equivalents, pure oxygen was fed to the mixed liquor via fine-bubble disk aerators, the flow rate of pure oxygen being up to 0.5 $m^3$ of oxygen per $m^3$ of wastewater, so that the oxygen content was always in the range from 2 to 3 mg/l. No problems occurred with sludge flotation in the secondary clarification tank.

What is claimed is:

1. A process for biological wastewater purification in a sewage treatment plant having an activation tank of a depth greater than approximately 5 m into which a feed of compressed air is fed, whereby separated in space or separated in time from said feed of compressed air an oxygen-containing gas having an oxygen content increased with respect to air, or pure oxygen, is fed continuously or at intervals, to a mixed liquor in at least a part of the aerobic tank volume of the activation tank, characterized in that said oxygen-containing gas is fed until the total content of gas in the mixed liquor, based on the saturation value, is below 150%, before the mixed liquor is fed to a secondary clarification.

2. The process as claimed in claim 1, wherein the oxygen-containing gas used is technical-grade oxygen.

3. The process as claimed in claim 1, wherein the oxygen-containing gas or pure oxygen is fed to the activation tank in the last third of the activatior tank or in the last aerobic tank of a tank cascade.

4. The process as claimed in claim 1, wherein the oxygen-containing gas or pure oxygen replaces a conventional aeration at intervals for a period of 15 to 45 minutes per hour.

5. The process as claimed in claim 1, wherein the oxygen-containing gas or pure oxygen replaces a conventional aeration at elevated hydraulic loading.

6. The process as claimed in claim 1, wherein the input of the oxygen-containing gas or pure oxygen is controlled as a function of a sludge level in the secondary clarification.

7. The process as claimed in claim 1, wherein an input of the oxygen-containing gas or pure oxygen is controlled as a function of the total gas content in the mixed liquor.

8. The process as claimed in claim 1, wherein an input of the oxygen-containing gas or pure oxygen is controlled according to two preset values, separate in time and/or space, For the oxygen content in the mixed liquor or according to one preset value for the oxygen content and one preset value for a total gas content in the mixed liquor.

9. The process as claimed in claim 1, wherein the oxygen-containing gas or pure oxygen is fed via a pipe-line to the activation tank.

10. The process as claimed in claim 1, wherein the oxygen-containing gas or pure oxygen is additionally fed to the mixed liquor in the event of shock loadings of the wastewater with an increased oxygen demand or in the case of an increased energy demand of the sewage treatment plant.

\* \* \* \* \*